(12) United States Patent
Gates et al.

(10) Patent No.: US 7,254,310 B2
(45) Date of Patent: Aug. 7, 2007

(54) CLOCK-SLAVING IN A PROGRAMMABLE VIDEO RECORDER

(75) Inventors: Matthijs A. Gates, Seattle, WA (US); Jai Srinivasan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1216 days.

(21) Appl. No.: 10/206,158

(22) Filed: Jul. 25, 2002

(65) Prior Publication Data

US 2004/0018005 A1     Jan. 29, 2004

(51) Int. Cl.
H04N 5/76 (2006.01)
H04N 7/00 (2006.01)
H04N 7/04 (2006.01)
H04N 7/06 (2006.01)
H04N 7/08 (2006.01)
H04N 7/26 (2006.01)
H04N 7/12 (2006.01)

(52) U.S. Cl. ............................ 386/46; 386/95; 386/111; 348/423.1

(58) Field of Classification Search .................... 386/1, 386/33, 95, 98, 111–112; 348/423.01
See application file for complete search history.

(56) References Cited

U.S. PATENT DOCUMENTS

| 6,363,207 | B1 * | 3/2002 | Duruoz et al. ................. 386/68 |
| 6,587,635 | B1 * | 7/2003 | Subramanian et al. ......... 386/68 |
| 6,611,624 | B1 * | 8/2003 | Zhang et al. ................. 382/232 |
| 6,766,407 | B1 * | 7/2004 | Lisitsa et al. ................. 710/316 |
| 6,801,709 | B1 * | 10/2004 | Park ........................... 386/68 |
| 7,030,812 | B2 * | 4/2006 | Bekritsky et al. ........... 342/387 |

* cited by examiner

*Primary Examiner*—Thai Q. Tran
*Assistant Examiner*—Gelek Topgyal
(74) *Attorney, Agent, or Firm*—Workman Nydegger

(57) ABSTRACT

According to one embodiment, a Programmable Video Recorder (PVR) receives streaming multimedia data from a data source and stores the multimedia data in a backing store. Prior to being stored, the multimedia data is assigned Presentation TimeStamps (PTS)s according to a capture graph clock that is associated with the PVR. Thereafter, system clock times that correspond with the times in which each data packet is read from the backing store are compared with the corresponding PTSs of each data packet to generate a clock scaling value that is used to slave the system clock with the capture graph clock. The clock scaling value may include the average of a plurality of scaling values that are calculated during a predetermined duration of time corresponding with the most recently read data packets.

43 Claims, 5 Drawing Sheets

CLOCK-SLAVING IN A PROGRAMMABLE VIDEO RECORDER

BACKGROUND OF THE INVENTION

1. The Field of the Invention

The present invention is directed to clock-slaving in a computing system and, more particularly, to synchronizing the effective rates of different clocks that are used when writing and reading streaming multimedia data in a Programmable Video Recorder (PVR).

2. Related Technology

The PVR, also known as the Digital Video Recorder (DVR), has recently entered the home entertainment market as a device that is capable of providing many conveniences not previously considered practical for the traditional Video Cassette Recorder (VCR). Once particular benefit provided by the PVR is that the PVR is capable of simultaneously recording and playing different data content. In particular, the PVR utilizes a writer that is capable of writing data to a storage medium at the same time a reader accesses and reads the same or different data from the storage medium.

The utility of being able to record and play data at the same time is a significant advantage over the traditional VCR. In particular, the PVR enables the viewer watching a live or broadcast program to temporarily pause, rewind or replay a portion of the recorded program without interrupting the contemporaneous recording of the broadcast. Accordingly, the viewer can later watch the portions of the program that were broadcast and recorded during the temporary pause in the play of the program.

To enable this functionality, the PVR includes a temporary storage buffer that is included within a storage medium. The buffer that is utilized by many PVRs includes a ring buffer that is configured to store a predetermined amount of data. Ring buffers, which are well-known to those of ordinary skill in the art, are configured to sequentially record data until the ring buffer becomes full. Then, once the ring buffer becomes full, the most recently received data is written over the oldest data in a continuous and cyclical manner.

The ring buffer is useful for maintaining a copy of the most recently received data. Accordingly, even if the viewer pauses, slows down, or stops the play of the program, the most recently received data will continue to be written to the buffer for access at a later time. However, if the viewer pauses the program for such a lengthy period of time that the capacity of the buffer is exceeded, then portions of the recorded data that have not yet been rendered will be overwritten and lost, which is typically undesirable.

Even when a viewer is not pausing or stopping the play of the recorded program for an extended period of time, however, the recorded data may still be undesirably overwritten and lost. This may occur, for instance, when the reader continuously reads the data at a slower rate than the data is written to the buffer. This may actually occur without the viewer's knowledge. One reason data may be read at a relatively slower rate than it is recorded is that different clocks associated with the PVR may be set at different speeds or frequencies.

The PVR may be associated with numerous clocks for controlling the rate at which data is received, processed, recorded and rendered. However, only two clocks are specifically addressed herein. A first clock, which is referred herein as a capture graph clock, may be used as a reference for assigning Presentation TimeStamps (PTS)s to the data before the data is written to the buffer. The PTSs that are assigned to the data correspond with an intended presentation playback rate of the recorded data. A second clock, which is referred to herein as a system clock, may be used as a reference for reading and rendering the data with respect to the assigned PTSs.

A description of the relationship between the capture graph clock and the system clock will now be provided with reference to the data sample 110 that is shown in FIG. 1. As a matter of example, data sample 110 includes a plurality of data packets (D1, D2, D3, D4 and D5). Data sample 110 may include audio data, video data, and any other type of multimedia data. Data sample 110 may also include non-multimedia data, such as events, markers, metadata, and so forth. The data packets (D1, D2, D3, D4 and D5) represent portions of the data sample 110 that have been assigned PTSs according to a capture graph clock. For instance, data packet D1 has been assigned a PTS of PTS=1, data packet D2 has been assigned a PTS of PTS=2, and so forth, wherein the increments may correspond with seconds or other units of time.

The data sample 110 may be stored in a ring buffer or any other type of storage medium that is associated with the PVR. When the data sample 110 is read, it will be rendered according to the PTSs that have been assigned to the data packets. For instance, if the PTSs correspond with seconds, then data packet D1 will theoretically be rendered one second after commencing the playback of the data sample, then one second later data packet D2 will be rendered, then one second later data packet D3 will be rendered, and so forth.

However, the actual duration associated with one theoretical second may vary between the capture graph clock and the system clock due to slight variations as described below. Accordingly, even though the capture graph clock may intend for the data packets to be rendered at desired presentation times, the system clock may cause the data packets to be read and rendered at a slower rate if the system clock runs at a slower rate than the capture graph clock.

When the system clock runs at a slower rate than the capture graph clock for an extended period of time, the capacity of the buffer will eventually be exceeded, thereby causing the data to overwritten and lost. In contrast, when the system clock runs faster than the capture graph clock for an extended period of time, the playback rate will eventually exceed the rate in which the data is written to the buffer, thereby causing an underflow problem and a choppy playback.

It is desirable, therefore, to ensure that the capture graph clock and the system clock are running at the same rates. However, even when the capture graph clock and the system clock are programmed to run at the same rate, slight irregularities may still cause the two clocks to run at slightly different rates. This phenomena may be more clearly understood in reference to other types of time-keeping devices. For instance, wristwatches that are synchronized will typically become unsynchronized over an extended period of time, notwithstanding the fact that they are originally configured to run at the same rate (e.g., a 24 hour/day, 60 minute/hour and 60 second/minute). The reason for this is that the watches may have slight variations or irregularities that cause the wristwatches to run at slightly different rates. Variations in the power supply to the watches may also cause them to run at slightly different rates. This is also true of the capture graph clock and the system clock that are associated with the PVR.

BRIEF SUMMARY OF THE INVENTION

The present invention is directed to improved methods, systems and computer program products for clock-slaving a capture graph clock that is associated with a Programmable Video Recorder (PVR) and one or more system clocks that are associated with one or more readers that read multimedia data from a backing store in the PVR.

According to one embodiment, a computing system such as a PVR receives streaming multimedia data from a data source. The multimedia data is packetized and stored in a backing store of the PVR. Prior to storing the multimedia data into the backing store, Presentation TimeStamps (PTS)s are assigned to the data packets of the multimedia data. The PTSs assigned to the multimedia data correspond with an intended playback rate of the multimedia data. The assignment of the PTSs is at least partially based on a capture graph clock that is associated with the PVR. One or more readers reading the multimedia data from the backing store use corresponding system clocks to render the multimedia data at the desired playback rate.

According to one aspect of the invention, the system clocks associated with the readers are 'clock-slaved' to the capture graph clock. In other words, the system clocks are adjusted to run at the same rate as the capture graph clock, so that the multimedia data can be read at the same rate it is recorded and intended to be played.

According to one embodiment, a clock scaling value is used to adjust the frequency of the system clocks so that they will run at the same rate as the capture graph clock. The clock scaling value may be computed by comparing the times that occur on a system clock, when each data sample is read, with the PTS that is assigned to each of the read data samples. The difference between the assigned PTSs and the system clock times can be charted to determine a slope, which represents the clock scaling value, or variation between the system clock and the capture graph clock.

In one embodiment, the clock scaling value is determined by evaluating a plurality of PTSs and a plurality of system clock times that correspond with the most recently read data over a predetermined duration of time, such as, for example, about five minutes. In this manner, the system clock is clock-slaved with the capture graph clock contemporaneously with the most recent conditions that may have affected the rate of the system clock over the predetermined duration of time.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
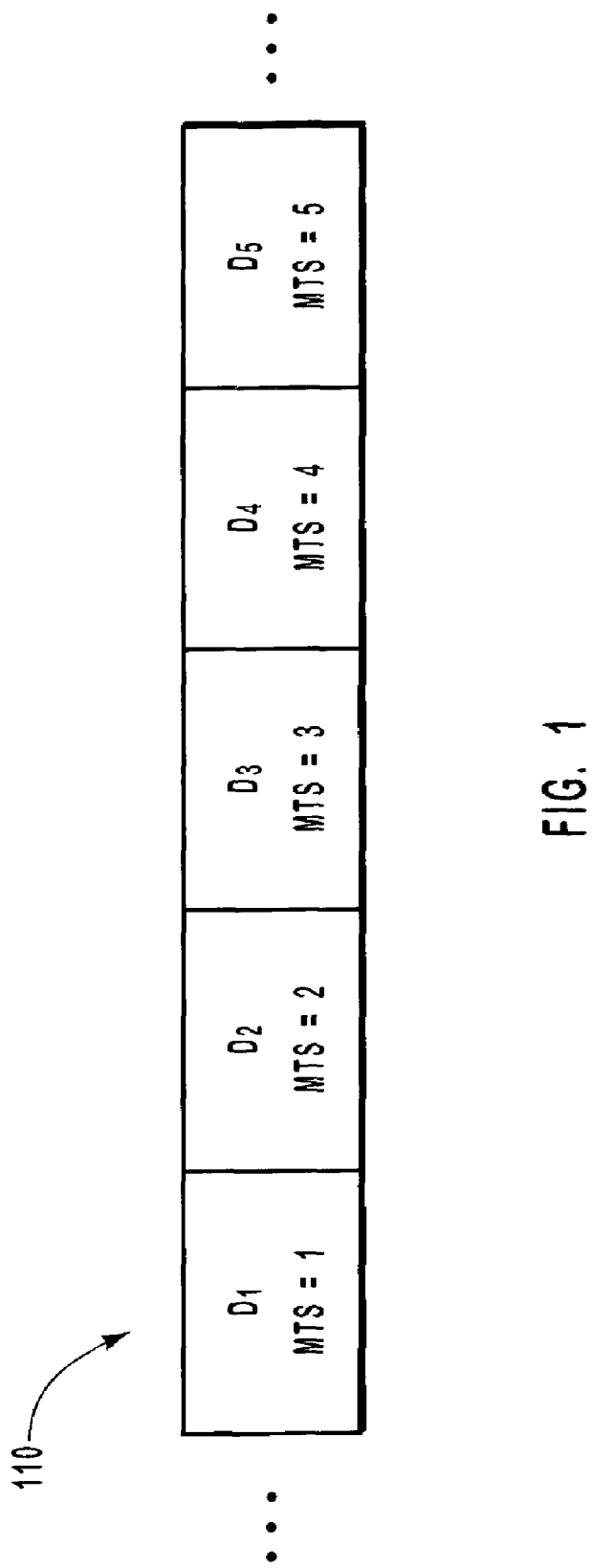
FIG. 1 illustrates one embodiment of a multimedia data sample that includes a plurality of data samples that have been assigned presentation timestamps.

The present invention extends to improved methods, systems and computer program products for clock-slaving in a Programmable Video Recorder (PVR).

According to one embodiment, a PVR receives streaming multimedia data from a data source and stores the multimedia data in a backing store. Prior to being stored, the multimedia data is assigned Presentation TimeStamps (PTS)s according to a capture graph clock that is associated with the PVR. Thereafter, system clock times that correspond with the times in which each data packet is read from the backing store are compared with the corresponding PTSs of each data packet to generate a clock scaling value that is used to slave the system clock with the capture graph clock. The clock scaling value may include the average of a plurality of scaling values that are calculated during a predetermined duration of time corresponding with the most recently read data packets.

The embodiments of the present invention may comprise a general-purpose or special-purpose computing system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computing system. By way of example, and not limitation, such computer-readable media can comprise physical storage media such as RAM, ROM, EEPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computing system.

The term "network," as defined herein, includes any architecture where two or more computing systems may exchange data with each other. When information is transferred or provided over a network or another communications link (either hardwired, wireless, or a combination of hardwired or wireless) to a computing system or computer device, the link is properly viewed as a computer-readable medium. Thus, any such link is properly termed a computer-readable medium. Combinations of the above should also be included within the scope of computer-readable media. Computer-executable instructions comprise, for example, instructions and data which cause a general-purpose computing system or special-purpose computing system to perform a certain function or group of functions.

The term "computing system," as described herein, is defined as one or more software modules, one or more hardware modules, and any combinations thereof that work together to perform operations on electronic data. For example, the computing system may include hardware components, as well as software modules for executing computer-executable instructions. The computing system may also include one or more computers coupled via a computer network. Likewise, the computing system may include a single physical device (such as a Programmable Video Recorder "PVR") where internal modules work together to perform operations on electronic data.

Those of ordinary skill in the art will appreciate that the invention described herein may be practiced in network computing environments with many types of computing system configurations, including personal computers, laptop computer, hand-held devices, multi-processor systems, microprocessor-based or programmable consumer electronics, network PCs, minicomputers, mainframe computers, mobile telephones, PDAs, and the like. The invention may also be practiced in distributed computing environments where local and remote computing systems, which are linked (either by hardwired links, wireless links, or by a combination of hardwired or wireless links) through a communication network, both perform tasks. In a distributed computing environment, program modules may be located in both local and remote memory storage that is either volatile or non-volatile.

Figure 2:
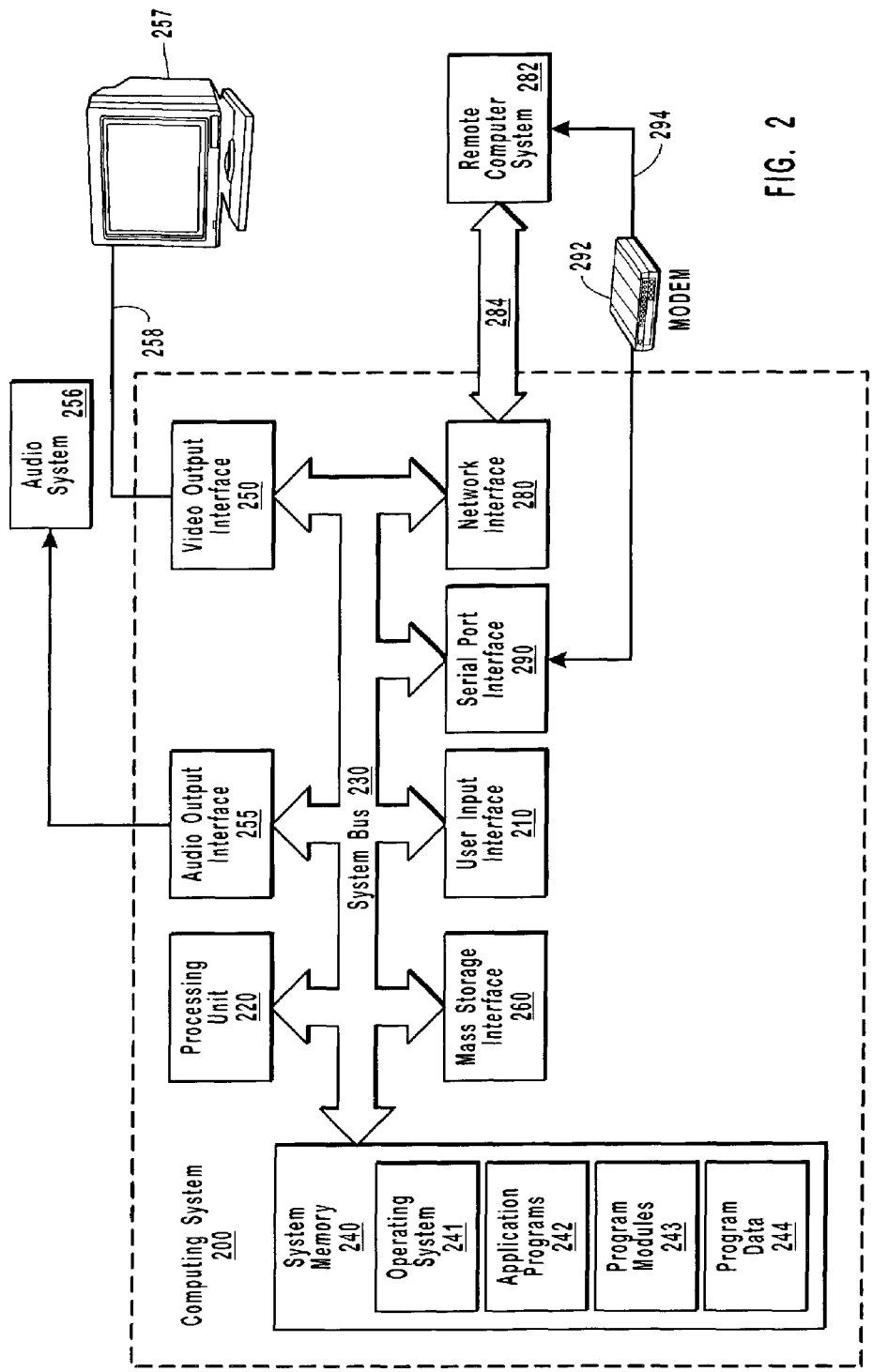
FIG. 2 illustrates one example of a computing system that may be used for practicing the present invention.

With reference to FIG. 2, an example of a computing system 200 that may be used to implement the principles of the invention is illustrated. According to one embodiment, the computing system 200 may be a PVR that has been adapted to perform the operations that are disclosed herein.

FIG. 2 and the following discussion are intended to provide a brief, general description of one example of a suitable computing environment in which the invention may be implemented. Although not required, the invention will be described in the general context of computer-executable instructions, such as program modules, being executed by computing systems. Generally, program modules include routines, programs, objects, components, data structures, and the like, which perform particular tasks or implement particular abstract data types.

As shown, computing system 200 may include user input interface 210, which may receive information from an input device such as, for example, a keyboard, mouse, microphone, or remote control. An input device may be coupled to user input interface 210 so as to enable the entry of information. An input device may transfer information over such a coupling in response to preprogrammed data or user manipulation of the input device.

Computing system 200 includes processing unit 220, which may allow for complex and flexible general-purpose processing capabilities. Processing unit 220 may execute computer-executable instructions designed to implement features of computing system 200, including features of the present invention. Processing unit 220 is coupled via system bus 230, which also interconnects various other system components, such as system memory 240. System memory 240 generally represents a wide variety of volatile and/or non-volatile memories and may include types of memory previously discussed. However, the particular type of memory used in computing system 200 is not important to the present invention. Program code means comprising one or more program modules may be stored in system memory 240. The one or more program modules may include an operating system 241, one or more application programs 242, other program modules 243, and program data 244.

Computing system 200 may also include video output interface 250, which may provide a video output signal to external video display devices, such as monitor 257. Computing system 200 may be integrally positioned with or separate from a video display device such as monitor 257. Monitor 257 may be configured to display items of different sizes and to display items in different colors. Monitor 257 may be further configured to appropriately update displayed items that change in size and/or color dynamically. Monitor 257 may be coupled to video output interface 250 via video link 258 so as to receive a provided video output signal. Examples of other suitable display devices include, but are not limited to, PDA displays, displays of other portable devices, televisions, computer monitors, and so forth.

Similarly, computing system 200 may also include audio output interface 255, which may provide an audio output signal to external audio output devices, such as audio system 256. The computing system 200 may be integrally positioned with or separate from the audio system 256, which may include a speaker or other device capable of emitting sound data. The audio system 256 may be coupled to audio output interface 255 so as to receive a provided audio output signal. Non-limiting examples of suitable audio systems include stereo systems, amplifiers, radios, television audio systems, and so forth.

Computing system 200 may also include mass storage interface 260, which is configured to read data from and to write data to a mass storage device, such as, for example, a magnetic disk storage device (e.g., a Digital Video Disk (DVD), a Compact Disk (CD)), an optical disk storage device, and a computer hard disk drive. A mass storage device may be coupled to mass storage interface 260 so as to enable the reading and writing of data. When a mass storage device is coupled to mass storage interface 260, one or more program modules including operating system 241, application programs 242, other program modules 243, and program data 244 may be stored in the mass storage device.

Computing system 200 may include network interface 280, through which computing system 200 may receive data from or transmit data to external sources, such as for example, a remote computing system 282 or database. The computing system 200 and the remote computer system 282 may be network connectable to Local Area Networks (LANs) and Wide Area Networks (WANs), such as the Internet, that include external computing systems and databases. The computing system 200 may be connected with the remote computer system 282 through any suitable network communication link 284, as described below. The remote computer system 282 may also be connected to the computer system 200 through a serial port interface 290 and an appropriate modem communication link 294 via modem 292.

As defined herein, the term "communication link" includes any communication path that may enable the transport of electronic data between two entities such as computing systems or modules. The actual physical representation of a communication path between two entities is not important and may change over time. A logical communication link may include portions of a system bus, a local area network, a wide area network, the Internet, combinations thereof, or portions of any other path that may facilitate the transport of electronic data. Communication links may include hardwired links, wireless links, or a combination of hardwired links and wireless links. Communication links may also include software or hardware modules that condition or format portions of data so as to make them accessible to components that implement the principles of the present invention. Such components may include, for example, proxies, routers, firewalls, or gateways. Communication links may also include portions of a Virtual Private Network ("VPN").

While FIG. 2 and the corresponding discussion provide a general description of a suitable computing system in which the invention may be implemented, it will be appreciated that the features of the present invention, as disclosed herein, may be practiced in association with a variety of different system configurations.

Figure 3:
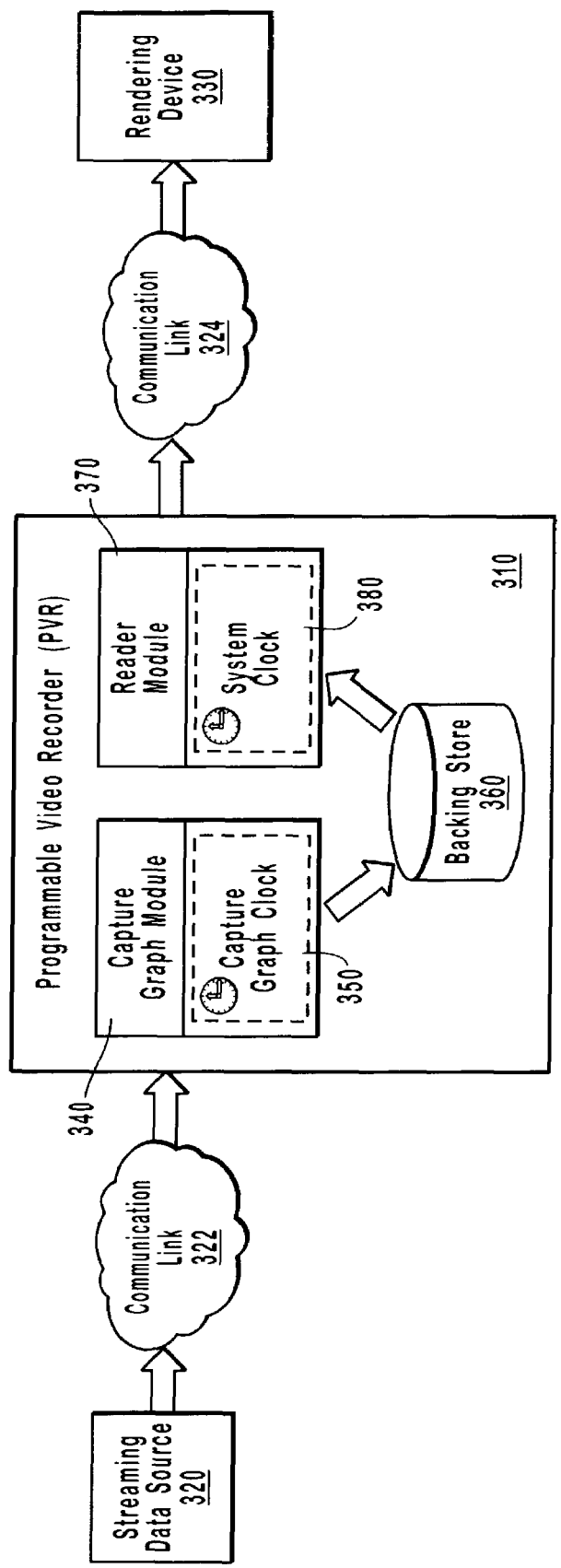
FIG. 3 illustrates a network environment in which a computing system comprising a programmable video recorder, that is associated with a capture graph clock and a system clock, is connected to a data source and a rendering device.

FIG. 3 illustrates one embodiment of a network environment in which a computing system comprising a Programmable Video Recorder (PVR) 310 is connected to a data source 320 and a rendering device 330 through appropriate communication links 322 and 324.

Although certain embodiments described herein are made in reference to one or more rendering devices 330, it will be appreciated that the rendering device(s) 330 are optional. Accordingly, the invention may be practiced even if the PVR 310 is not in communication with a rendering device 330. Alternatively, the rendering device 330 may be located remotely from the PVR 310. The rendering device 330 may include an audio system 256 or a display monitor 257 as described above in reference to FIG. 2.

The data source 320 may comprise any source of data that is received in a 'live' feed by the PVR. Non-limiting examples of data sources 320 include Internet servers, broadcast stations, satellite networks, cable networks, radio stations, and so forth. The data source 320 may also comprise a fixed storage medium, such as a DVD, CD ROM, a floppy disk, and so forth.

The PVR 310 is shown in the present embodiment to include a capture graph module 340 that includes a capture graph clock 350. During use, the capture graph module 340 and the capture graph clock 350 operate to assign Presentation TimeStamps (PTS)s to packets of the multimedia data that are received from the data source 320. The PTSs correspond with an intended playback rate of the multimedia data.

In one embodiment, the multimedia data includes streaming multimedia data that is packetized into discrete data packets. The streaming multimedia data may include, for example, a multimedia sample like the one illustrated in FIG. 1 that includes a plurality of data packets. The multimedia data may be packetized at the PVR 310 or prior to being received by the PVR.

Upon being received, the multimedia data is written to a buffer or storage medium associated with the PVR 310 such as, for example, backing store 360. Backing store 360 has a fixed storage capacity for storing a limited amount of multimedia data. The backing store 360 may be included within the system memory 240 of FIG. 2 or within a storage device that is connected with the PVR 310 through a suitable interface, such as interface 260.

According to one embodiment, the PVR 310 is also associated with a reader module 370 and a system clock 380 that operate with one or more rendering devices 310 to access and render the multimedia data that is stored in the backing store 360. As shown, the reader module 370 and the system clock 380 may be located locally within the PVR 310. However, it will be appreciated that the reader module 370 and the system clock 380 may also be located remote from the PVR 310, such as, for example, within rendering device 330. Furthermore, although only a single rendering device 330 and a single system clock 380 are illustrated, the PVR 310 may be associated with any number of rendering devices 330 and any number of corresponding system clocks 380.

The system clock 380 is used to control the rate in which the multimedia data is rendered. In particular, the system clock 380 is used as a reference for rendering the multimedia data according to the assigned FTSs of the multimedia data. However, as described above, if the system clock 380 runs at a different rate than the rate of the capture graph clock 350, which was used to assign the PTSs, then the multimedia data will not be rendered at the intended playback rate. This may also lead to a choppy playback or a loss of data during playback, as explained above. Accordingly, the principles of the present invention slave the system clock 380 to the capture graph clock 350 so that they will effectively run at the same rate.

Figure 4:
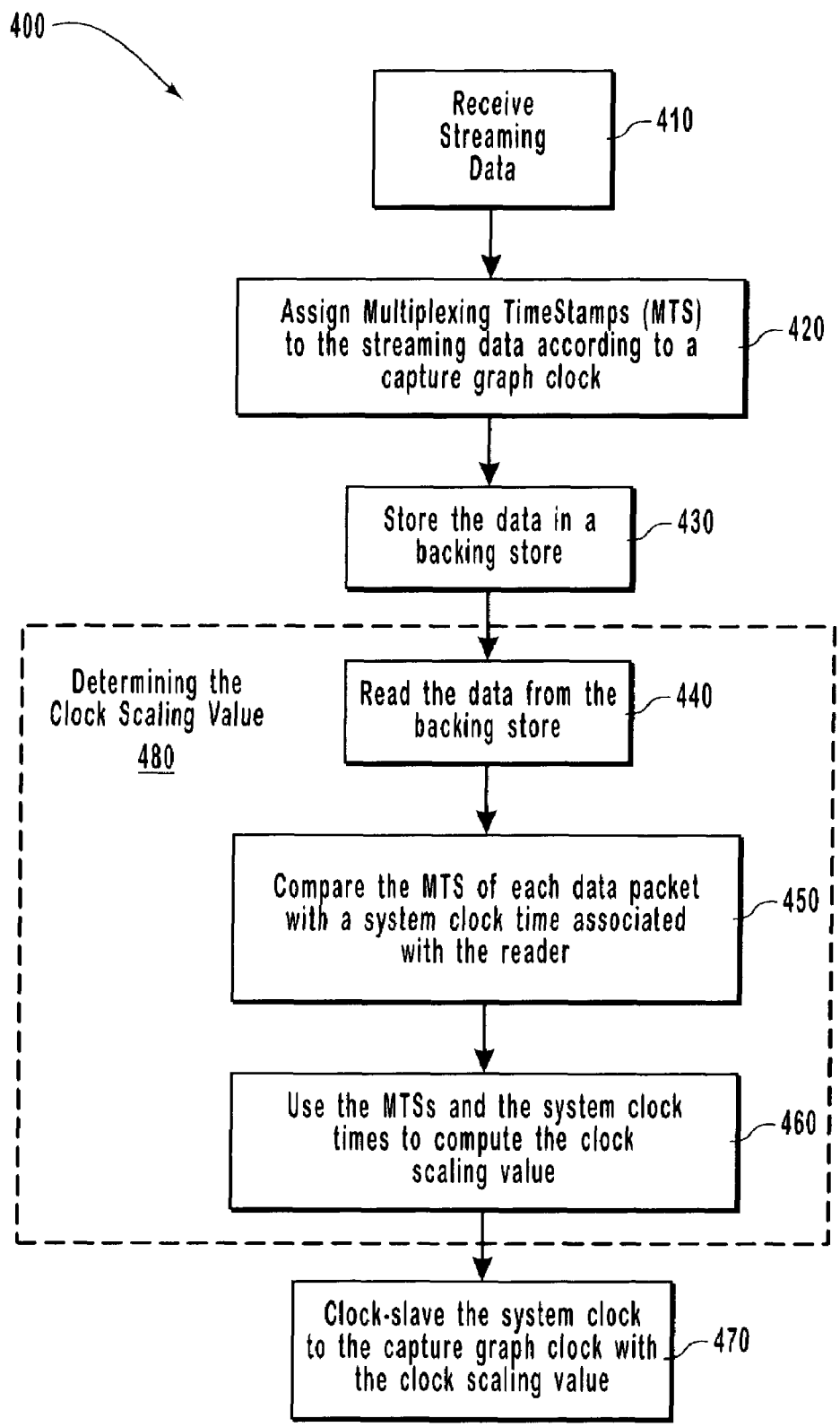
FIG. 4 is a flow diagram illustrating one example of one method for clock-slaving in a programmable video recorder.

FIG. 4 illustrates one example of a flow diagram 400 of a method for clock-slaving one or more system clocks to the capture graph clock in a PVR. As shown, the present method includes various acts (acts 410, 420, 430, 440, 450, 460 and 470) and a step 480 that may be performed by the PVR 310 of FIG. 3.

The first illustrated act is to receive streaming data 410, act 410. As described above, the streaming data may be received from any suitable data source. Upon receiving the streaming data, which may include multimedia data, the PVR assigns PTSs to the streaming data, act 420. In one embodiment, the streaming data includes multimedia data that is packetized into a plurality of data packets, such that act 420 is performed when one or more of the data packets are assigned corresponding PTSs according to an intended playback rate of the multimedia data. The PTSs are assigned to the data packets based on the rate in which the capture graph clock is running. After appropriate PTSs have been assigned, the data packets are written to or otherwise stored in the backing store 360 of the PVR 310, act 430.

Next, the method includes the step for determining a clock scaling value that will be used to slave the system clock(s) with the capture graph clock. Step 480 may include any corresponding acts that are suitable for determining a clock scaling value that can be used to slave the system clock(s) with the capture graph clock. In the present embodiment, step 480 is described as including the corresponding acts of reading the data from the backing store 360 (act 440), comparing the PTS of each read data packet with a system clock time that is associated with the reader at the time each data packet is read (act 450), and using the PTSs and the system clock times to compute the clock scaling value that will be used to slave the system clock to the capture graph clock (act 460).

The final act shown is to clock slave the system clock to the capture graph clock with the clock scaling value (act 470). Some of the foregoing acts will now be described with specific reference to the multimedia sample 110 of FIG. 1 and the graph 500 of FIG. 5.

Figure 5:
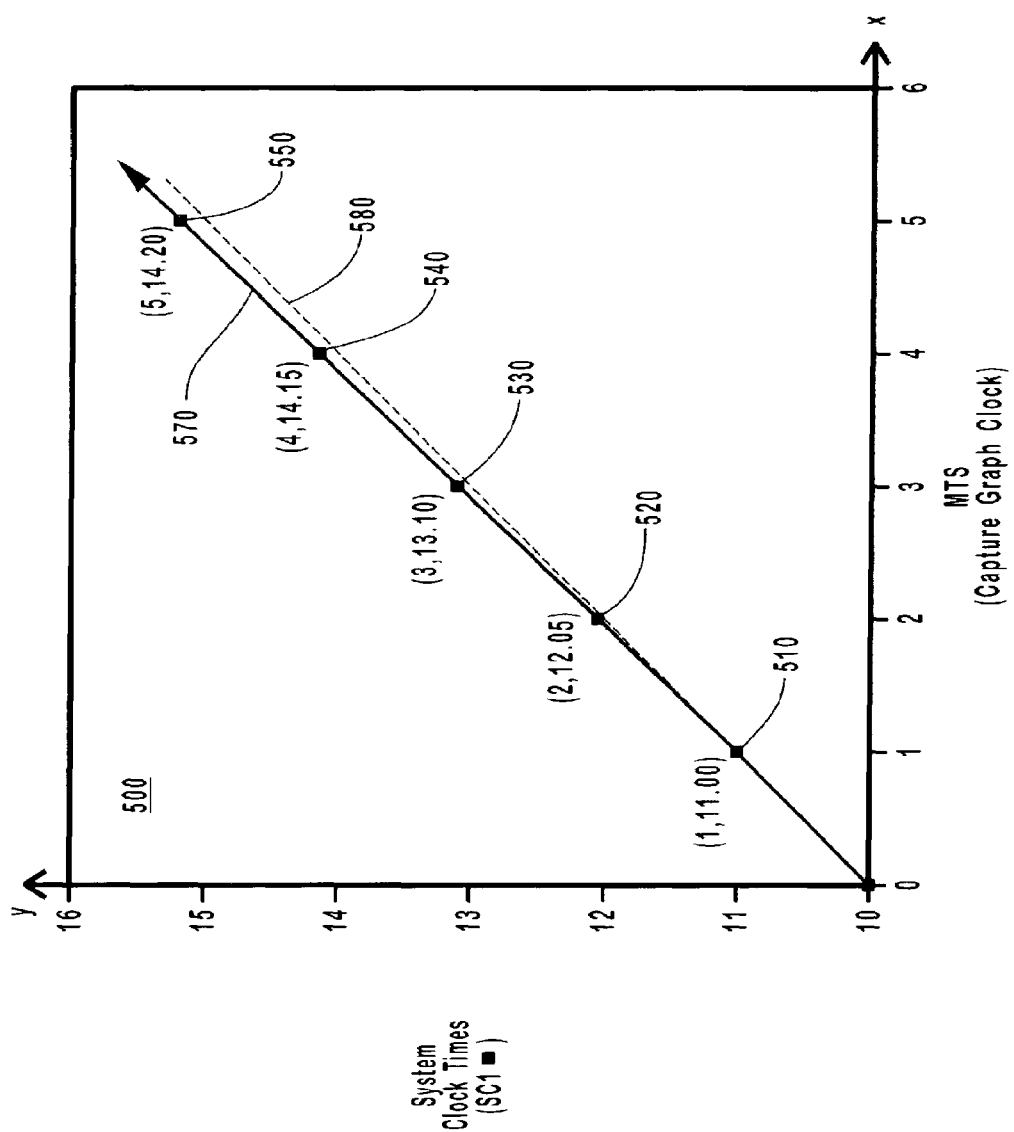
FIG. 5 illustrates a graph that charts the presentation timestamps of the data samples of FIG. 1 with respect to a system clock that is running at a different rate than a capture graph clock that was used to assign PTSs to the data samples.

FIG. 5 illustrates a graph 500 that charts the PTSs assigned to the data packets (D1, D2, D3, D4 and D5) of FIG. 1 with respect to a system clock that is used as a reference for rendering the data packets according to the PTSs. Although only a single system clock is described in this example, it will be appreciated that two or more different system clocks may also be utilized by the PVR to enable different data or the same data to be rendered on two or more different rendering devices at the same time. As described herein, graph 500 may be obtained by performing the acts shown and described above in reference to FIG. 4.

First, it is assumed that the data packets (D1, D2, D3, D4 and D5) have already been written to the backing store by performing acts 410, 420 and 430. Next, the data packets are read (act 440) by a reader that is associated with the system clock. As the data packets are read, system clock times are obtained to detect any variation in the rate at which the system clock is running with respect to the capture graph clock. The system clock times are described herein as the times that are obtained from the system clock when the corresponding data packets are read.

For instance, the following system clock times are obtained when a first reader reads the data packets (D1, D2, D3, D4 and D5) of FIG. 1. The system clock time of 11.00 is obtained when the first data packet D1 is read, the system clock time of 12.05 is obtained when the data packet D2 is read, the system clock time of 13.10 is obtained when the data packet D3 is read, the system clock time of 14.15 is obtained when the data packet D4 is read, and the system clock time of 15.20 is obtained when the data packet D5 is read.

Each of these system clock times is charted with respect to the corresponding PTSs of the data packets that were read when the system clock times occurred, thereby producing data points 510, 520, 530, 540 and 550. For instance, data point 510 comprises the PTS of 1 along the X axis and the system clock time of 11.00 along the Y axis that correspond with the data packet D1. The remaining data points 520, 530, 540 and 550 are also charted according to the PTS and the system clock time that correspond with each of the remaining data packets D2, D3, D4 and D5, respectively.

A line that is drawn along the data points 510, 520, 530, 540 and 550 is illustrated as line 570. A second line 580 is also drawn to illustrate where the data points would have fallen if the system clock was running at the same rate as the capture graph clock. Accordingly, it is apparent that the system clock is running faster than the capture graph clock that was used for assigning the PTSs. In other words, more time passes between each incremental unit of time for the system clock than the time that passes between each incremental unit of time for the capture graph clock. For instance, for each incremental advancement of a PTS (e.g., from 1 to 2), the system clock advances 1.05 units. In one embodiment, the units of time correspond with seconds. However, the units of time may also correspond with fractions of a second, fractions of a minute or any other time unit.

The slope of line 570 can be used to detect the percent in which the rate of the system clock deviates from the rate of the capture graph clock. In the present embodiment, the slope is 1.05 (the difference in the rise (1.05) divided by the difference in the run (1)). Accordingly, the system clock is running five percent more quickly than the capture graph clock.

The slope that is obtained in this manner, by comparing the PTSs with the system clock times (acts 450 and 460), is referred to herein as the clock scaling value. The clock scaling value can then be used to adjust the rate at which the system clock runs. In the present embodiment, it would be prudent to reduce the rate of the system clock to compensate for the five percent discrepancy. This may be accomplished for example, by dividing the system clock rate by the clock scaling value. For instance if the system clock were running at 10 Mhz, then the adjusted system clock rate would be 10 Mhz divided by 1.05 (the clock scaling value), which is approximately 9.52 Mhz.

Although this is useful for resolving persistent deviation in the clock rates, this may not overcome unpredictable variations that may occur to the clock rates. For instance, perhaps the system clock is initially running faster than the capture graph clock, but then later begins to run slower than the capture graph clock. Accordingly, the results of computing only a single adjusted system clock rate may actually be counter productive if the system clock rate switches in the hypothetically described manner.

To accommodate for unpredictable variations, the number of data points that are used to compute the clock scaling value only include data points corresponding to the most recently read data packets that were read during a predetermined duration of time. In one embodiment, the predetermined duration of time is approximately five minutes, although the predetermined duration of time may also be within the range of between one minute and ten minutes, or within any other range of time periods.

During the predetermined duration of time, several discrete scaling values are averaged together to obtain the clock scaling value. For instance, the graph 500 of FIG. 5 may be used to obtain only a single one of the many scaling values that are averaged together over the predetermined duration. The number of data points that are used to obtain a single scaling value may be as few as two and as many as desired. In one embodiment, the number of data points used to obtain a single scaling value is within the range of five and thirty, such as, for example twenty.

The act of using the PTSs and the system clock times to compute the clock scaling value (460) may also include the act of discarding certain data points that fall outside of permitted threshold requirements. For example, threshold requirements may be established to avoid computing data points that represent anomalies or that may otherwise skew the results. In one embodiment, a threshold requirement of about five percent is established to throw out any data points that deviate more than about five percent from the previous data point. It will be appreciated, however, that any threshold requirement may be established.

Similar threshold requirements may also be established to throw out unusually high or low scaling values that would otherwise be averaged with the other scaling values to obtain the clock scaling average. For instance, a scaling value may be thrown out if it deviates more than five percent from any immediately proceeding scaling values.

If one or more data points or scaling values are thrown out because they fail a threshold requirement, the predetermined duration of time that is used for calculating the clock scaling value still advances like a moving window so that only the most recently read data packets within the predetermined duration of time are used to compute the clock scaling value. It will be appreciated, however, that the methods of the invention may utilize any number of data packets that are read over any duration of time, as desired, to accommodate different needs and preferences.

Accordingly, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that receives streaming multimedia data from a data source, the computing system including a backing store configured to store data packets of the multimedia data that can be accessed by at least one reader, wherein the computing system is configured to assign presentation timestamps to the data packets prior to storing the data packets, and wherein the presentation timestamps correspond with a desired presentation of the multimedia data, a method for synchronizing the rate of a system clock that is associated with a reader reading the multimedia data with the rate of a capture graph clock that is used when assigning the presentation timestamps to the data packets of the multimedia data, the method comprising:

an act of receiving streaming multimedia data from a data source the streaming multimedia data including a plurality of data packets;

an act of assigning presentation timestamps to the plurality of data packets as they are received according to a capture graph clock that is included in the computing system;

an act of storing each of the plurality of data packets in the backing store upon assigning presentation timestamps to the data packets;

an act, for each data packet that is read from the backing store with a reader, of comparing the presentation timestamp of each data packet with a system clock time that occurs on a system clock when each data packet is read by the reader;

an act of using at least one presentation timestamp and at least one system clock time to compute a clock scaling value that can be used to synchronize the rate of the system clock with the rate of the capture graph clock; and an act of using the clock scaling value to adjust the rate for the system clock to the rate of the capture graph clock.

2. A method as recited in claim 1, wherein the act of computing a clock scaling value includes the act of using a plurality of presentation timestamps and plurality of system clock time that correspond to a plurality of recently read data packets to obtain at least one scaling value, the plurality of recently read data packets being disposed within predetermined duration of multimedia content and the scaling value representing any difference between a rate in which the presentation timestamps where assigned to the recently read data packets and a rate of the system clock.

3. A method as recited in claim 2, wherein the plurality of recently read data packets is a number within the range of ten and twenty.

4. A method as recited in claim 3, wherein the plurality of recently read data packets is fifteen.

5. A method as recited in claim 4, wherein the predetermined duration is less than ten minutes.

6. A method as recited in claim 5, wherein the predetermined duration is five minutes.

7. A method as recited in claim 2, wherein the at least one scaling value includes a plurality of scaling values.

8. A method as recited in claim 7, wherein the plurality of scaling values includes 20 scaling values that are obtained over a predetermined duration of five minutes.

9. A method as recited in claim 7, wherein the plurality of scaling values are averaged to obtain the clock scaling value.

10. A method as recited in claim 9, wherein only some of the plurality of scaling values are averaged to obtain the clock scaling value.

11. A method as recited in claim 9, wherein certain scaling values are not averaged when they fail one or more threshold requirements.

12. A method as recited in claim 11, wherein one of the one or more threshold requirements is that the scaling value falls within five percent of an inunediately proceeding scaling value.

13. A method as recited in claim 2, wherein the predetermined duration corresponds to a most recently read duration of multimedia data by the reader.

14. A method as recited in claim 1, wherein the multimedia data includes video data.

15. A method as recited in claim 1, wherein the multimedia data includes audio data.

16. A method as recited in claim 1, wherein a plurality of readers access the multimedia data from the backing store, and where in the method includes the following acts:

the act, for each data packet that is read from the backing store with one of the plurality of readers, of comparing the presentation timestamp of each data packet with a system clock time that occurs on a system clock when each data packet is read by a reader that is associated with the system clock;

an act of using at least one presentation timestamp and at least one-system clock time to compute a clock scaling value that can be used to synchronize a rate of each system clock with the rate of the capture graph clock; and an act of using the clock scaling value to adjust the rate of each system clock to the rate of the capture graph clock.

17. In a computing system that receives streaming multimedia data from a data source, the computing system including a backing store configured to store data packets of the multimedia data that can be accessed by at least one reader, wherein the computing system is configured to assign presentation timestamps to the data packets prior to storing the data packets, and wherein the presentation timestamps correspond with a desired presentation of the multimedia data, a method for synchronizing the rate of a system clock that is associated with a reader reading the multimedia data with the rate of a capture graph clock that is used when assigning the presentation timestamps to the data packets of the multimedia data, the method comprising:

an act of receiving streaming multimedia data from a data source, the streaming multimedia data including a plurality of data packets;

an act of assigning presentation timestamps to the plurality of data packets as they are received according to a capture graph clock that is included in the computing system;

an act of storing each of the plurality of data packets in the backing store upon assigning presentation timestamps to the data packets;

a step for determining a clock scaling value that can be used to synchronize the rate of the system clock that is associated with the reader with the rate of the capture graph clock; and an act of using the clock scaling value to adjust the rate of the system clock to the rate of the capture graph clock.

18. A method as recited in claim 17, wherein the step for determining the clock scaling value includes the following:

an act, for each data packet that is read from the backing store with a reader, of comparing the presentation timestamp of each data packet with a system clock time that occurs on a system clock when each data packet is read by the reader;

and an act of using at least one presentation timestamp and at least one system clock time to compute a clock scaling value that can be used to synchronize the rate of the system clock with the rate of the capture graph clock.

19. A method as recited in claim 18, wherein the act of computing a clock scaling value includes the act of using a plurality of presentation timestamps and a plurality of system clock times that correspond to a plurality of recently read data packets to obtain at least one scaling value, the plurality of recently read data packets being disposed within a predetermined duration of multimedia content and the scaling value representing any difference between a rate in which the presentation timestamps where assigned to the recently read data packets and a rate of the system clock.

20. A method as recited in claim 19, wherein the plurality of recently read data packets is a number within the range often and twenty.

21. A method as recited in claim 19, wherein the predetermined duration is less than ten minutes.

22. A method as recited in claim 21, wherein the predetermined duration is five minutes.

23. A method as recited in claim 19, wherein the at least one scaling value includes a plurality of scaling values.

24. A method as recited in claim 23, wherein the plurality of scaling values includes 20 scaling values that are obtained over a predetermined duration of five minutes.

25. A method as recited in claim 23, wherein the plurality of scaling values are averaged to obtain the clock scaling value.

26. A method as recited in claim 23, wherein only some of the plurality of scaling values are averaged to obtain the clock scaling value.

27. A method as recited in claim 26, wherein certain scaling values are not averaged when they fail one or more threshold requirements.

28. A method as recited in claim 27, wherein one of the one or more threshold requirements is that the scaling value falls within five percent of an immediately proceeding scaling value.

29. A method as recited in claim 19, wherein the predetermined duration corresponds to a most recently read duration of multimedia data by the reader.

30. A method as recited in claim 17, wherein the multimedia data includes at least one of audio data and video data.

31. A computer program product for a computing system that receives streaming multimedia data from a data source, the computing system including a backing store configured to store data packets of the multimedia data that can be accessed by at least one reader, wherein the computing system is configured to assign presentation timestamps to the data packets prior to storing the data packets, and wherein the presentation timestamps correspond with a desired presentation of the multimedia data, the computer program product comprising:

one or more computer-readable storage media storing computer executable instructions for implementing a method for synchronizing a rate of a system clock that is associated with a reader reading the multimedia data with a rate of a capture graph clock that is used when assigning the presentation timestamps to the data packets of the multimedia data, the method comprising:

an act of receiving streaming multimedia data from a data source, the streaming multimedia data including a plurality of data packets;

an act of assigning presentation timestamps to the plurality of data packets as they are received according to a capture graph clock that is included in the computing system;

an act of storing each of the plurality of data packets in the backing store upon assigning presentation timestamps to the data packets;

an act, for each data packet that is read from the backing store with a reader, of comparing the presentation timestamp of each data packet with a system clock time that occurs on a system clock when each data packet is read by a reader that is associated with the system clock;

an act of using at least one presentation timestamp and at least one system clock time to compute clock scaling value that can be used to synchronize the rate of the system clock, with the rate of the capture graph clock; and an act of using the clock scaling value to adjust the rate of the system clock to the rate of the capture graph clock.

32. A computer program product as recited in claim 31, wherein the one or more computer-readable media include system memory.

33. A computer program product as recited in claim 31, wherein the act of computing a clock scaling value includes the act of using a plurality of presentation timestamps and a plurality of system clock times that correspond to a plurality of recently read data packets to obtain at least one scaling value, the plurality of recently read data packets being disposed within a predetermined duration of multimedia content and the scaling value representing any difference between a rate in which the presentation timestamps where assigned to the recently read data packets and a rate of the system clock.

34. A computer program product as recited in claim 33, wherein the plurality of recently read data packets is a number within the range often and twenty.

35. A computer program product as recited in claim 33, wherein the predetermined duration is less than ten minutes.

36. A computer program product as recited in claim 35, wherein the predetermined duration is five minutes.

37. A computer program product as recited in claim 33, wherein the at least one scaling value includes a plurality of scaling values.

38. A computer program product as recited in claim 37, wherein the plurality of scaling values are averaged to obtain the clock scaling value.

39. A computer program product as recited in claim 37, wherein only some of the plurality of scaling values are averaged to obtain the clock scaling value.

40. A computer program product as recited in claim 39, wherein certain scaling values are not averaged when they fail one or more threshold requirements.

41. A computer program product as recited in claim 40, wherein one of the one or more threshold requirements is that the scaling value falls within five percent of an immediately proceeding scaling value.

42. A computer program product as recited in claim 33, wherein the predetermined duration corresponds to a most recently read duration of multimedia data by the reader.

43. A computer program product as recited in claim 31, wherein the multimedia data includes at least one of video data and audio data.

* * * * *